(12) United States Patent
Green

(10) Patent No.: US 12,114,639 B1
(45) Date of Patent: Oct. 15, 2024

(54) SYSTEM AND METHOD FOR COLLECTING AND PROCESSING ANIMAL WASTE

(71) Applicant: Alexander S. Green, Arlington, TX (US)

(72) Inventor: Alexander S. Green, Arlington, TX (US)

( * ) Notice: Subject to any disclaimer, the term of this patent is extended or adjusted under 35 U.S.C. 154(b) by 0 days.

(21) Appl. No.: 18/401,943

(22) Filed: Jan. 2, 2024

(51) Int. Cl.
*A01K 1/00* (2006.01)
*A01K 1/01* (2006.01)
*B02C 21/02* (2006.01)
*B02C 25/00* (2006.01)

(52) U.S. Cl.
CPC ............ *A01K 1/0128* (2013.01); *B02C 21/02* (2013.01); *B02C 21/026* (2013.01); *B02C 25/00* (2013.01)

(58) Field of Classification Search
CPC ....... B02C 21/026; B02C 21/02; B02C 25/00; A01K 1/0128
See application file for complete search history.

(56) References Cited

U.S. PATENT DOCUMENTS

| | | | | |
|---|---|---|---|---|
| 2,841,946 A | * | 7/1958 | Sutherland | A01D 34/435 56/289 |
| 4,619,412 A | * | 10/1986 | Willingham | A01K 31/04 404/91 |
| 5,901,911 A | * | 5/1999 | Davis | A01K 1/0146 241/101.77 |
| 6,000,647 A | * | 12/1999 | Hardy | A01K 1/01 241/101.763 |
| 6,820,358 B1 | * | 11/2004 | Huelsewiesche | E02F 7/02 172/123 |
| 8,740,117 B1 | * | 6/2014 | Zimmerman | A01K 31/04 241/185.5 |
| 8,915,458 B2 | * | 12/2014 | Bender | B02C 21/02 241/193 |
| 2002/0129773 A1 | * | 9/2002 | Beiler | A01K 31/04 119/442 |
| 2012/0168545 A1 | * | 7/2012 | Bender | B02C 21/02 241/101.71 |
| 2013/0092095 A1 | * | 4/2013 | Morris | A01B 43/005 119/442 |
| 2019/0166788 A1 | * | 6/2019 | Xu | A01K 1/0146 |
| 2021/0212295 A1 | * | 7/2021 | Heatwole | A01K 1/015 |

FOREIGN PATENT DOCUMENTS

| | | | | |
|---|---|---|---|---|
| CN | 109105267 A | * | 1/2019 | ........... A01K 1/0142 |
| EP | 2594129 A1 | * | 5/2013 | .............. A01K 1/01 |
| KR | 20230080794 A | * | 6/2023 | ........... A01K 1/0128 |

* cited by examiner

*Primary Examiner* — Faye Francis
(74) *Attorney, Agent, or Firm* — Baker Botts L.L.P.

(57) ABSTRACT

A system for collecting and processing animal waste includes a plurality of wheels, a scoop, an impeller, at least one motor, and a chute, each of which is coupled to a chassis. The scoop is configured to shovel animal waste that is received by the impeller, which is configured to fragmentize the animal waste with at least one spinning blade and deliver the fragmentized animal waste to the chute, which in turn facilitates delivery of the fragmentized animal waste to a receptacle.

19 Claims, 4 Drawing Sheets

SYSTEM AND METHOD FOR COLLECTING AND PROCESSING ANIMAL WASTE

TECHNICAL FIELD

This disclosure relates generally to waste management, and more particularly, to systems and methods of collecting and processing animal waste.

BACKGROUND

Animal waste is an excellent fertilizer for plants because it contains nitrogen, phosphorus, and potassium. For this reason, many farmers and ranch-owners collect the waste of horses, cattle, and other animals for subsequent processing into fertilizer. But collecting animal waste is often an undesirable task due to, for example, the laborious and time-consuming nature of the activity, in addition to the offensive odor.

Conventionally, animal waste is collected using a pitchfork or similar device and deposited into a wheelbarrow, where it may then be transported and transferred into a pile for composting. This process is dirty and requires extensive time and energy.

SUMMARY OF THE DISCLOSURE

According to one embodiment, a system includes a chassis, a plurality of wheels, a handle, a scoop, an auger, an impeller, at least one electric motor, a battery, a receptacle, and a chute. The plurality of wheels are coupled to the chassis and the handle is coupled to a back end of the chassis. The scoop is configured to shovel manure, includes a plurality of fingers positioned in spaced relation, and is hingedly coupled to a front end of the chassis. The auger is coupled on each end to the chassis and is positioned posterior to the scoop. The auger is configured to rotate relative to the chassis to interact with and discharge the manure shoveled by the scoop. The impeller is coupled to the chassis and positioned posterior to the auger and includes a plurality of spinning blades, which comprise a material selected from the group consisting of steel, aluminum, or plastic. The impeller is configured to receive the manure discharged from the auger and fragmentize the manure with one or more of the plurality of spinning blades. The at least one electric motor is coupled to the chassis and is configured to provide power to the impeller and the auger. The battery is coupled to, and is configured to provide power to, the at least one electric motor. The receptacle is configured to be removably coupled to the back end of the chassis and is further configured to receive and contain the manure. The chute includes a first end and a second end, wherein the first end is removably coupled to the receptacle and the second end is removably coupled to the chassis. Further, the impeller is configured to drive the manure to the chute, which in turn is configured to facilitate delivery of the manure to the receptacle.

According to another embodiment, a system includes a chassis, a plurality of wheels, a scoop, an impeller, at least one motor, and a chute. The plurality of wheels are coupled to the chassis. The scoop is hingedly coupled to a front end of the chassis and is configured to shovel animal waste. The impeller is coupled to the chassis and includes at least one spinning blade. The impeller is configured to receive the animal waste from the scoop and fragmentize the animal waste with the at least one spinning blade. The at least one motor is coupled to the chassis and is configured to provide power to the impeller. The chute is also coupled to the chassis and is configured to receive the animal waste from the impeller and facilitate delivery of the animal waste to a receptacle.

Certain embodiments may provide one or more technical advantages. For example, an embodiment of the present disclosure provides the ability to gather and process animal waste more quickly and efficiently, relative to conventional methods. As another example, the collection process contemplated by the present disclosure may be more hygienic than conventional solutions because the present disclosure provides a method of collecting and containing animal waste in a closed receptacle as opposed to an open wheelbarrow. As yet another example, certain embodiments of the present invention contemplate breaking down the animal waste before it is transferred to the receptacle, which may facilitate faster decomposition than traditional methods. Other technical advantages will be readily apparent to one skilled in the art from the following figures, description, and claims. Moreover, while specific technical advantages have been enumerated above, various embodiments may include some, all, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION OF THE INVENTION

Turning animal waste into useable fertilizer is commonplace for establishments such as ranches, farms, and equestrian facilities. Traditional methods of collecting animal waste include picking up the waste manually with, e.g., a pitchfork or similar device, depositing it into a wheelbarrow, and transporting and delivering the collected waste into a pile where it will remain until sufficiently composted. Because this method is dirty and requires significant time and effort, there exists a need to find a more hygienic, efficient, and less strenuous way to collect animal waste for processing into fertilizer.

The present disclosure contemplates a system for collecting and breaking down animal waste that addresses various drawbacks of conventional systems. The present invention allows a user to collect, process, and contain animal waste more efficiently than conventional methods. Additionally, unlike in an open wheelbarrow, the system contemplated herein may reduce and/or eliminate potential spillage and physical contact with the animal waste, making the process more hygienic than conventional wheelbarrow solutions. Because the animal waste receives some processing (e.g., fragmentation from the auger and/or impeller) prior to being contained in a receptacle, a person of ordinary skill in the art will recognize that the present invention may result in a reduction in decomposition time relative to conventional methods.

Figure 1A:
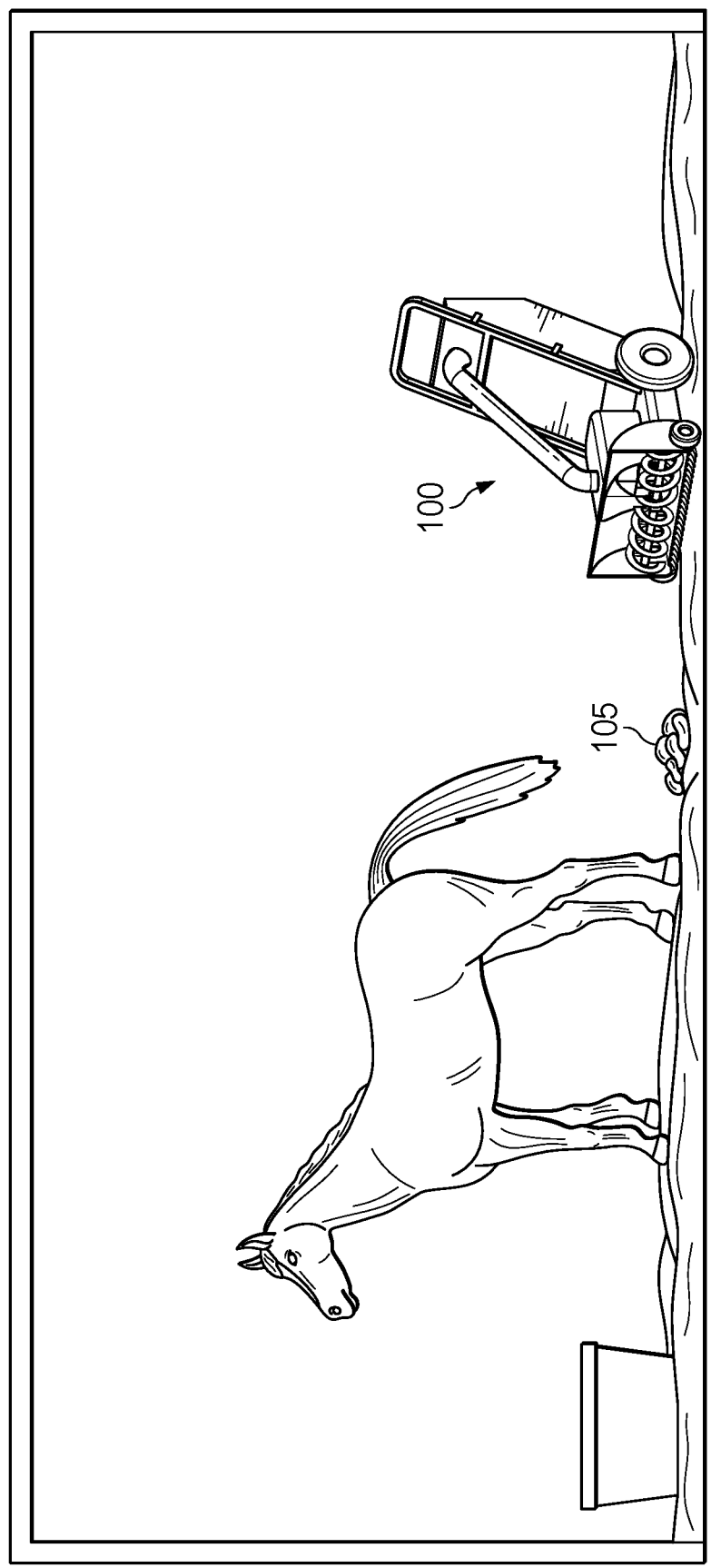
FIG. 1A illustrates an embodiment of a system of collecting and processing animal waste within an exemplary environment.

FIG. 1A illustrates an exemplary embodiment of a system 100 for collecting and processing animal waste 105 within a particular environment (i.e., horse stable). Although this disclosure describes and illustrates particular environments where system 100 may be used, this disclosure contemplates using system 100 wherever may be practicable and/or desirable. For example, other environments for system 100 may include pastures, residential backyards, parks, etc.

Figure 1B:
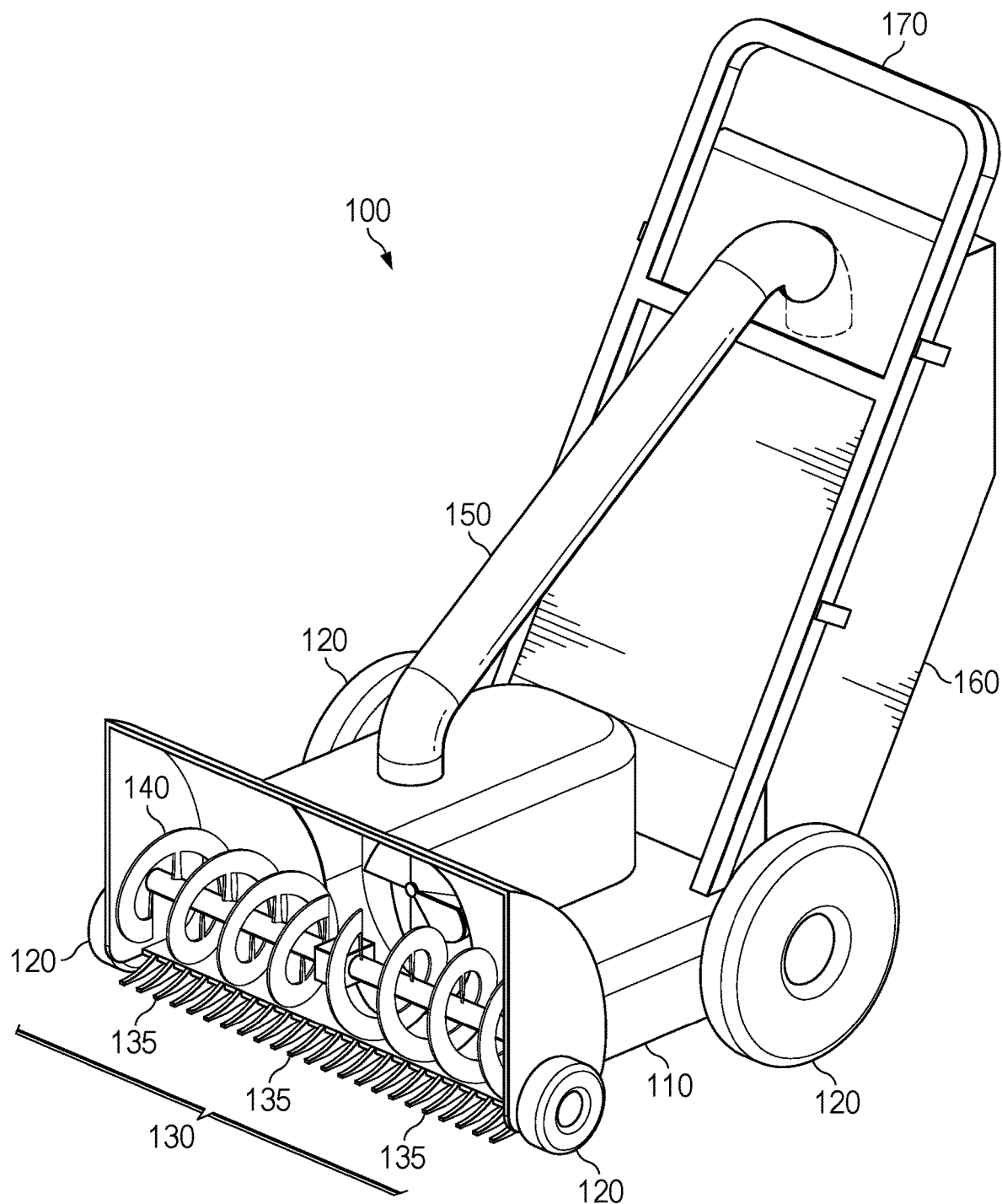
FIG. 1B illustrates an enlarged view of the system depicted in FIG. 1A.

FIG. 1B is an enlarged view of system 100. In some embodiments, e.g., the embodiment of FIG. 1B, system 100 includes a chassis 110, a plurality of wheels 120, a scoop 130, an impeller (depicted in FIG. 1C as impeller 180), at least one motor (depicted in FIG. 1C as motor 190), and a chute 150. As depicted in FIG. 1B, system 100 may also optionally include an auger 140, a handle 170, and a receptacle 160.

In operation, system 100 collects and processes animal manure by navigating to (e.g., by a force applied to handle 170 causing rotation of one or more of plurality of wheels 120) and shoveling animal waste 105 using scoop 130. Animal waste 105 is thereafter passed to impeller 180, where it is fragmentized by one or more spinning blades (e.g., blades 185 of FIG. 1C) before being directed to chute 150, which facilitates delivery of animal waste 105 to receptacle 160. In some embodiments, such as the embodiment depicted in FIGS. 1A-1C, further fragmentation is provided by auger 140, which receives animal waste 105 from scoop 130 and delivers such waste to impeller 180.

Turning now to FIG. 1B, chassis 110 serves as the main support structure of system 100. One or more components may be coupled to chassis 110. In particular, this disclosure recognizes that one or more of the plurality of wheels 120 may be coupled to chassis 110, as well as each of scoop 130, impeller 180, the at least one motor 190, and chute 150. As will be described in further detail below, other components may optionally be coupled to chassis 110 (e.g., auger 140).

As described above, one or more wheels 120 may be coupled to chassis 110. Generally, wheels 120 are configured to rotate to allow system 100 to move around an environment (e.g., stable, pasture, residential backyard, park, etc.). As will be recognized by one of ordinary skill in the art, wheels 120 may be rotated in response to a force exerted on handle 170. In some particular embodiments, one or more wheels 120 may be electrically coupled to the at least one motor 190, which drives the rotation of wheels 120. In such embodiments, wheels 120 may be controlled by a controller (e.g., mobile or stationary device) configured to control movement of system 100 (e.g., the speed and direction of system 100).

Wheels 120 may be of any suitable shape, size, and material. For example, wheels 120 may be round in shape, have a diameter large enough to maintain scoop 130 in a desirable position (e.g., contacting the ground), and consist of rubber and/or plastic. In some embodiments, system 100 includes two wheels 120. In other embodiments, system 100 includes more than two wheels 120. As an example, system 100 may include four wheels 120 (as depicted in FIG. 1B). In embodiments comprising more than two wheels 120, one or more front wheels 120 of system 100 may differ in size, shape, and/or material from one or more back wheels 120. For example, it may be advantageous for system 100 to include front wheels that are smaller in diameter than back wheels (see e.g., FIG. 1B).

Figure 1C:
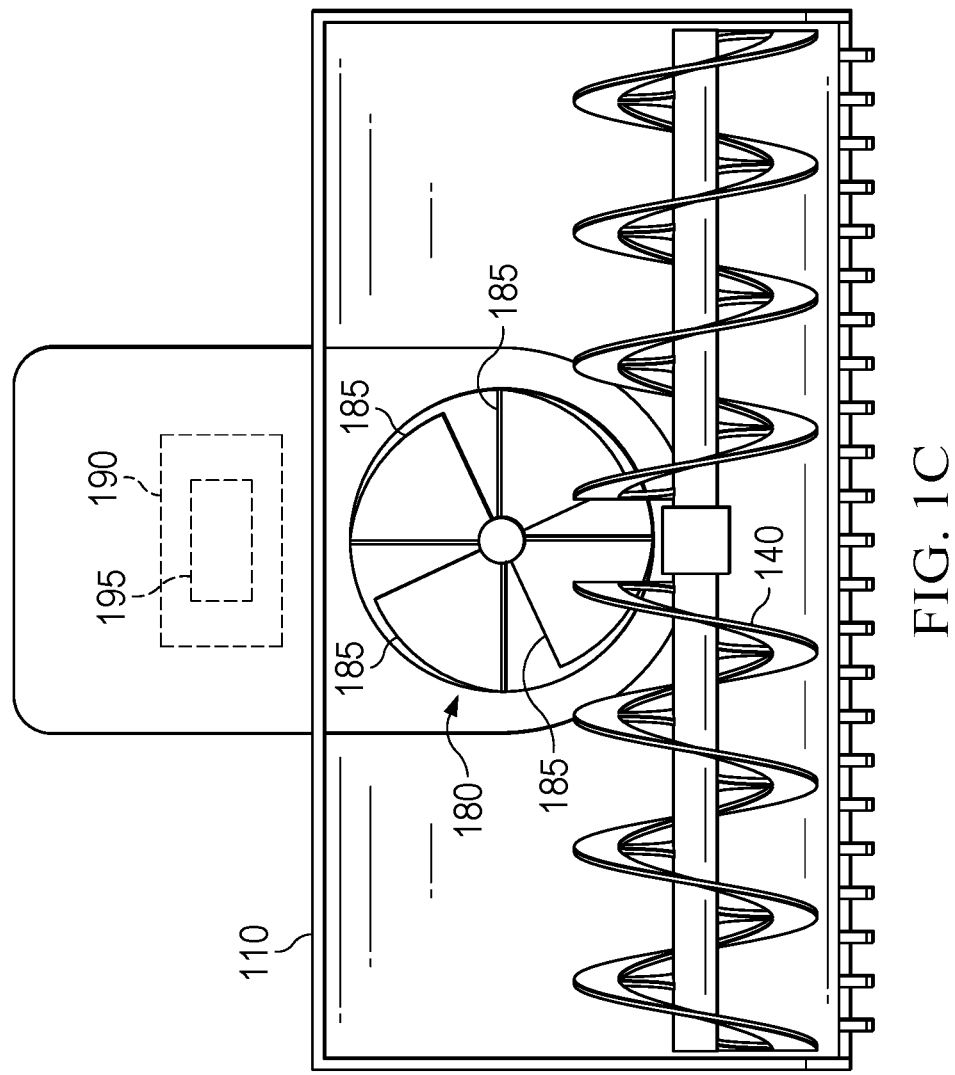
FIG. 1C illustrates a cutaway view of a system of collecting and processing animal waste, according to some embodiments.

As shown and described in reference to FIGS. 1A-1C, system 100 also includes scoop 130. Scoop 130 may be configured to shovel animal waste 105 and deliver the animal waste to one or more downstream components of system 100, such as auger 140 and/or impeller 180. As described above, scoop 130 may be coupled to chassis 110. In some embodiments, scoop 130 is hingedly coupled to chassis 110 to permit flexible movement that accommodates irregular or changing terrain within an environment.

As depicted in FIGS. 1A-1C, scoop 130 may include a plurality of fingers 135 positioned in spaced relation. In some embodiments, fingers 135 are spaced approximately 0.25 to 3 inches apart. As used herein, the term "approximately" refers to a differential of +/−10%. In some embodiments, fingers 135 are composed of a plastic or metal material. Although this disclosure describes and depicts a particular embodiment of scoop 130, this disclosure contemplates that scoop 130 may be of any suitable size, shape, and/or material. For example, scoop 130 may alternatively be a solid sheet of a curved material comprising metal or plastic.

Certain embodiments of system 100 include auger 140, which may be positioned posterior to scoop 130. Auger 140 may be coupled on each end to chassis 110 and extend at least partially between two or more wheels 120 of system 100. Auger 140 may be configured to rotate relative to chassis 110 and facilitate the transfer of animal waste 105 from scoop 130 to impeller 180.

In some embodiments, auger 140 includes an axle with one or more blades. As depicted in FIGS. 1A-1C, the axle of auger 140 includes blades having rounded edges. In some embodiments, the auger blades have laterally projecting tangs. These tangs may be configured to grab animal waste 105 shoveled by scoop 130 and deliver animal waste 105 to impeller 180. Auger 140 may comprise any suitable shape, size, and/or material. For example, auger 140 may include one or more helical blades about the axle and may be made from a metal and/or plastic material.

As described above, system 100 includes impeller 180, which is configured to receive and fragmentize animal waste 105. Specifically, after receiving waste (from, e.g., scoop 130 and/or auger 140), impeller 180 fragmentizes the waste with one or more spinning blades 185. As will be recognized by one of ordinary skill in the art, impeller 180 may create an air pressure differential by causing the rotation of the one or more spinning blades 185, thereby creating an upward force that carries the fragmentized animal waste 105 into chute 150. Blades 185 may be composed of one or more materials, such as steel, aluminum, titanium, and/or plastic.

In some embodiments, impeller 180 is configured to be adjusted to generate different grades (i.e., levels of fineness) of fragmentized animal waste. For example, user of system 100 may adjust a grading setting of system 100 that in turn affects the rotation speed of blade (s) 185, such that animal waste 105 may be fragmented more or less finely. This disclosure also recognizes that blade (s) 185 may be removably installed within system 100 and selected for use with system 100 based on a desired grading. For example, user of system 100 may swap out blade (s) 185 for blades of a different shape, size, material, and/or number to provide finer or larger grades of fragmentized animal waste, as desirable.

As described above, system 100 includes chute 150, which is configured to receive and direct the flow of fragmentized animal waste 102 into a receptacle, such as receptacle 160. Accordingly, chute 150 may include two ends, one being coupled to chassis 110 and the other being coupled to receptacle 160. Chute 150 may be any suitable shape, size, and material. For example, in some embodiments, chute 150 may be circular or oblong, have a diameter equal to or greater than the diameter of impeller 180, and be made of flexible or inflexible materials, such as certain metals or plastics. In certain preferred embodiments, chute 150 is removably coupled to receptacle 160, permitting decoupling between receptacle 160 and system 100. Chute 150 may be coupled (removably or otherwise) to receptacle 160 in any suitable manner. In some embodiments, chute 150 is coupled to receptacle 160, using, e.g., straps, hooks, or latches. Chute 150 may also be removably coupled to chassis 110. Such configuration may permit the complete removal of chute 150 from system 100, which may allow chute 150 to be cleaned.

As one of ordinary skill in the art will recognize, chute 150 may also direct air flow to/from receptacle 160. In some embodiments, receptacle 160 may be configured to expel incoming air while simultaneously serving as a container for fragmentized animal waste 105. Air may be expelled, e.g., through one or more apertures of receptable 160. As one of ordinary skill in the art will recognize, permitting expulsion of air may facilitate the composting process. The material of receptacle 160 may also impact the speed of the process. This disclosure specifically recognizes that receptacle 160 may, in some embodiments, be formed of a biodegradable and/or reusable material such as cotton or burlap. In other embodiments, receptacle 160 is formed of non-biodegradable and/or disposable material such as certain plastics (e.g., polyethylene terephthalate or nylon) and/or metals (e.g., aluminum or steel). In some embodiments, receptacle 160 can accommodate a replaceable and/or removable liner, which may be changed at any desired frequency.

In certain embodiments, receptacle 160 includes a receptacle door (depicted in FIG. 2 as door 216) or similar opening, which is configured to release animal waste 105. In some embodiments, door 216 covers one or more apertures in receptacle 160, which are configured to restrict the flow of animal waste 105 through door 216. Such apertures may be sized appropriately to facilitate distribution of animal waste 105 in a desired location. In certain embodiments, the one or more apertures of receptacle 160 are accessible via a zippered door 216.

Figure 2:
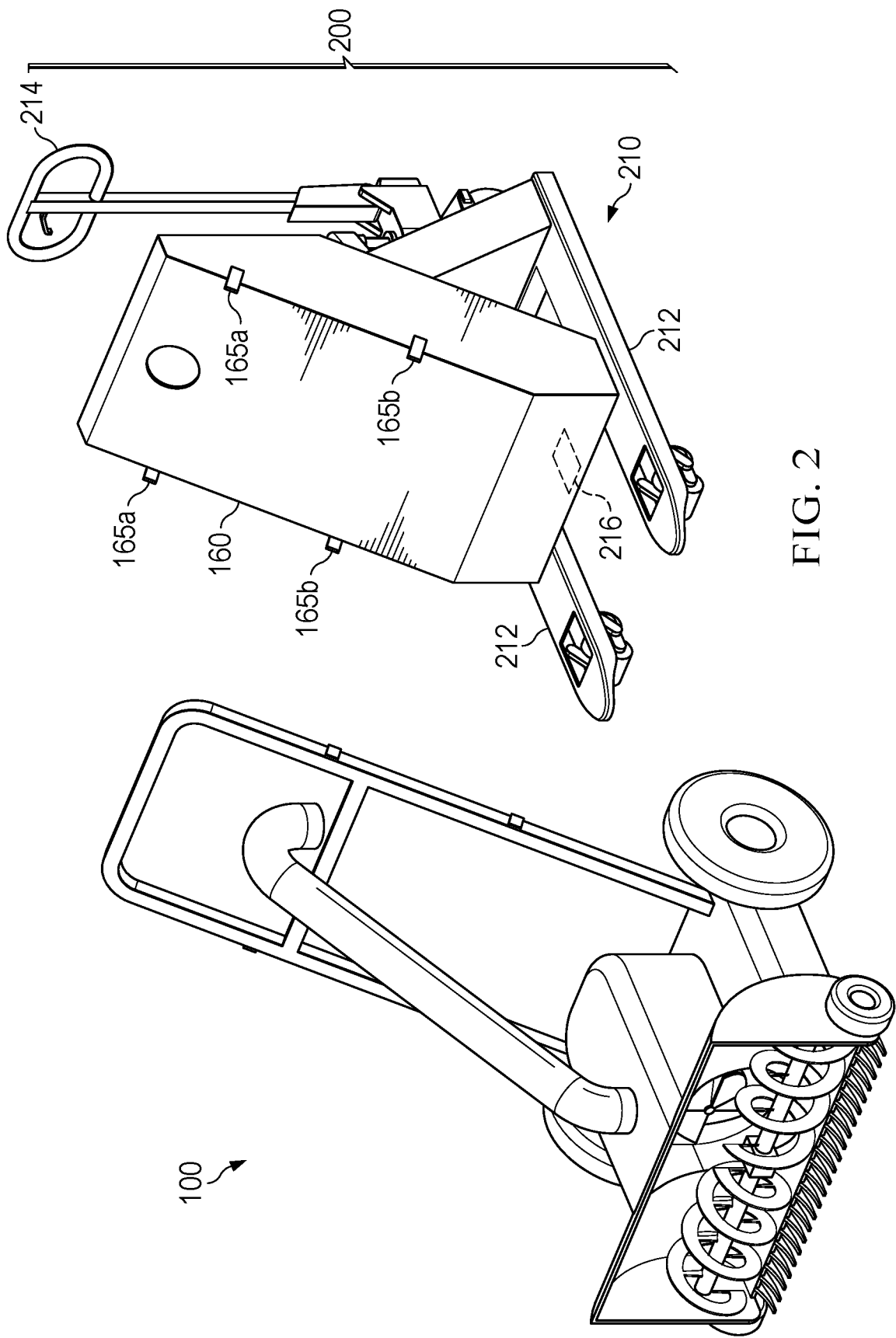
FIG. 2 illustrates an assembly comprising a system of collecting and processing animal waste, according to certain embodiments, and a system of transporting animal waste, according to certain embodiments.

As discussed above, receptacle 160 may be removably coupled to chute 150. Receptacle 160 may further be coupled to other components of system 100 for stability purposes. As an example, receptacle 160 may be removably coupled to chassis 110 and/or handle 170 for stability purposes. As depicted in FIG. 1C, receptacle 160 may include one or more retention clips 165 configured to snap onto or otherwise couple to handle 170 of system 100 and/or pallet jack 210. As depicted in FIG. 2, retention clips 165*a* are configured to couple receptacle 160 to handle 170 and retention clips 165*b* are configured to couple receptacle 160 to pallet jack 210.

Although this disclosure describes a particular mechanism for coupling receptacle 160 to handle 170 and/or pallet jack 210, this disclosure contemplates coupling receptacle 160 to handle 170 and/or pallet jack 210 in any suitable manner, such as through the use of hooks, latches, straps, or friction. For the avoidance of doubt, this disclosure also recognizes that receptacle 160 may couple to other components of system 100 for stability purposes.

In some embodiments, such as the embodiments shown herein, system 100 includes handle 170. In certain embodiments (e.g., those with non-motorized wheels), handle 170 is configured to be coupled to chassis 110 and extend upward. In such embodiments, a user can exert force on handle 170 causing rotation of wheel (s) 120 and, in turn, movement of system 100 through environment 110.

Although this disclosure describes and depicts handle 170 coupling to system 100 at/near chassis 110, this disclosure recognizes that handle 170 may couple to system 100 via other components of system 100. Handle 170 may be coupled to system 100 using fasteners (e.g., screws, nuts, and bolts). In particular embodiments, handle 170 is adjustable to accommodate users of different heights or to provide more or less leverage to move system 100. Adjustability could be achieved through, for example, pins that allow a user of system 100 to move handle 170 proximally or distally and lock it in place. In some embodiments, handle 170 is configured to be removable and/or collapsible/foldable to make storing system 100 easier. Furthermore, as is further discussed herein, handle 170 may be configured to be removably coupled to receptacle 160 to assist with stability of receptacle 160.

A front view, cross section of system 100 is provided in FIG. 1C, which illustrates certain componentry of system 100, including chassis 110, auger 140, chute 150, impeller 180 (and blades 185 thereof), motor 190, and battery 195. In some embodiments, system 100 includes some but not all of the components depicted in FIG. 1C.

As is described above and as will be readily understood by a person of ordinary skill in the art, motor 190 may be configured to provide power to one or components of system 100. As an example, motor 190 may provide power to one or more of auger 140, impeller 180, and/or wheels 120. This disclosure contemplates the use of any suitable motor (e.g., an electric motor, internal combustion motor) in connection with the inventions described herein, however, motor 190 is preferably an electric motor, especially in applications where system 100 is used in the presence of live animals.

Battery 195 may be made of any suitable material that provides the necessary current and voltage to motor 190 to drive one or more components of system 100, such as impeller 180, auger 140, and/or wheels 120. In some embodiments, battery 195 is a lithium-ion battery or a lead-acid battery. Further, battery 195 may be "hot swappable," meaning that battery 195 is easily removed and replaced with another battery in order to reduce the downtime of system 100. Accordingly, a user may replace battery 195 with another pre-charged battery, thereby extending the amount of time that system 100 can be used.

Turning now to FIG. 2, an assembly 200 including system 100 and a system of transporting animal waste is illustrated. As shown in FIG. 2, receptacle 160 may disengage from system 100 and engage with a pallet jack 210, thereby forming a system of transporting animal waste.

Receptacle 160 may be any suitable shape. In some embodiments, receptacle 160 is generally square, cylindrical, or rectangular. Although this disclosure describes and depicts receptacle 160 in a particular manner, this disclosure recognizes that receptacle 160 may be of any suitable size and shape. In preferred embodiments, the size and shape of receptacle 160 is selected for compatibility with pallet jack 210, which may include (as depicted in FIG. 2) one or more forks 212 extending from a handle 214. In such embodiments, receptacle 160 may disengage from system 100 by, for example, decoupling receptable 160 from chute 150 and handle 170, and engage with pallet jack 210 for transport.

As discussed above, receptacle 160 may include door 216, enabling animal waste 105 contained therein to be distributed and/or moved. In some embodiments, receptacle 160 is coupled to pallet jack 210 prior to or during transport to maintain stability. Receptacle 160 and pallet jack 210 may be coupled in any suitable manner. As shown in FIG. 2, receptacle 160 may couple to pallet jack 210 using retention clips 165 (such as retention clip 165b).

Door 216 may be located on or along a side of receptacle 160 and be configured to facilitate the release of animal waste 105. As shown in FIG. 2, door 216 is positioned along a bottom portion of receptacle 160. In some embodiments, receptacle 216 further includes a screen/sifter adjacent door 216, which allows the fragmentized animal waste to be distributed more evenly (relative to having no screen/sifter). In some embodiments, pallet jack 210 includes a mechanism to facilitate distribution of fragmentized animal waste once door 216 is opened, such as a spinning distribution wheel used in commercially available fertilizer and manure spreaders.

In some embodiments, system 100 includes at least one processor and a memory that would facilitate certain "smart" functionalities. As will be readily recognized by one of skill in the art, the at least one processor may be configured to execute instructions and the memory may be configured to store instructions to be executed by the processor. In one embodiment that includes a processor and a memory, a motor provides power to wheels 120 and a control device (e.g., standalone controller, smart phone) is configured to operates the speed and direction of wheels 120. Such embodiment may be preferable relative to embodiments that require manual force for operation. In such an embodiment, the at least one processor and memory is configured to receive (e.g., wirelessly) the inputs from the control device and use those inputs to direct wheels 120.

System 100 may include one or more other smart functionalities, such as the ability to detect and collect animal waste autonomously. Autonomous collection may be achieved through the use of the at least one processor and memory in addition to one or more sensors (e.g., heat sensor, visual sensor, odor sensor). As an example, the memory may store instructions to be executed by the at least one processor, which direct system 100 to (1) identify the location of animal waste using a heat sensor configured to detect heat output from animal waste; and (2) facilitate movement of system 100 to the location of the animal waste for autonomous collection and processing. As another example, the memory may store instructions to be executed by the at least one processor, which directs system 100 to (1) identify the location of animal waste using a visual sensor configured to detect animal waste based on, for example, one or more of the shape or color of the animal waste; and (2) facilitate movement of system 100 to the location of the animal waste for autonomous collection and processing. In some embodiments, the one or more sensors use an artificial intelligence program to detect, collect, and process animal waste autonomously.

This disclosure also contemplates system 100 optionally including a global positioning system ("GPS") sensor configured to detect the geographic location of system 100. For example, the GPS sensor may provide the location of system 100 to a mobile phone application controlled by the user of system 100 so that the user could geographically locate system 100. This disclosure also contemplates the use of the GPS sensor to allow system 100 to autonomously collect and process manure within geographic boundaries that may be defined by a user of system 100. In such an embodiment, system 100 would be configured to move autonomously within the set boundaries to collect and process manure. In some embodiments, system 100 may be further configured to send pings, notifications, and/or alerts concerning system 100 to a user device. As an example, in response to determining that system 100 is nearing and/or outside a boundary set by a user, system 100 may send an alert to a user device that may include location information for system 100. This disclosure recognizes that such determination may be made in any suitable way, including but not limited to: (1) determining a distance between the boundary being approached and system 100; and (2) comparing said distance to a threshold, which may or may not be provided by a user. As another example, in response to determining that system 100 has low battery (e.g., 20% or less battery life), system 100 may send an alert to a user device that may include location information for system 100. By providing such information to a user device, a user may be able to more easily locate system 100 in the event it is unable to return to "home" before running out of battery.

Though the present disclosure specifically contemplates that system 100 may collect and process animal waste deposited on rural land (e.g., pastures, farms, fields, horse stalls), this disclosure recognizes that system 100 may be useful in other settings and have other applications as well. As an example, system 100 may be used to collect animal waste deposited in residential backyards and/or parks. As another example, system 100 may be used to collect and process non-animal waste, such as leaves, twigs, and hay.

What is claimed is:

1. A system comprising:
   a chassis;
   a plurality of wheels coupled to the chassis;
   a handle coupled to a back end of the chassis;
   a scoop hingedly coupled to a front end of the chassis and configured to shovel manure, the scoop comprising a plurality of fingers positioned in spaced relation;
   an auger coupled on each end to the chassis, the auger being positioned posterior to the scoop and configured to rotate relative to the chassis to interact with and discharge the manure shoveled by the scoop;
   an impeller coupled to the chassis and positioned posterior to the auger, wherein:
      the impeller comprises a plurality of spinning blades, the spinning blades comprising a material selected from the group consisting of steel, aluminum, or plastic; and
      the impeller is configured to receive the manure discharged from the auger and fragmentize the manure with one or more of the spinning blades;
   at least one electric motor coupled to the chassis configured to provide power to the impeller and the auger;
   a battery coupled to the at least one electric motor configured to provide power to the at least one electric motor;
   a receptacle configured to be removably coupled to the back end of the chassis, the receptacle being configured to receive and contain the manure;
   a chute comprising a first end and a second end, the first end being removably coupled to the receptacle and the second end being removably coupled to the chassis; and
   wherein:
      the impeller is configured to drive the manure to the chute; and
      the chute is configured to facilitate delivery of the manure to the receptacle.

2. A system comprising:
   a chassis;
   a plurality of wheels coupled to the chassis;
   a scoop hingedly coupled to a front end of the chassis and configured to shovel animal waste;

an impeller coupled to the chassis and comprising at least one spinning blade, the impeller being configured to receive the animal waste from the scoop and fragmentize the animal waste with the at least one spinning blade, wherein a speed of the at least one spinning blade is adjustable;

at least one motor coupled to the chassis and configured to provide power to the impeller; and a chute coupled to the chassis and configured to receive the animal waste from the impeller and facilitate delivery of the animal waste to a receptacle.

3. The system of claim 2, further comprising:

an auger coupled on each end to the chassis, the auger being positioned posterior to the scoop and configured to rotate relative to the chassis to interact with and discharge the animal waste shoveled by the scoop; and wherein the motor is further configured to provide power to the auger.

4. The system of claim 2, wherein the motor is configured to provide power to the plurality of wheels.

5. The system of claim 2, further comprising a handle coupled to a back end of the chassis.

6. The system of claim 5, wherein one or more of the chassis or the handle are configured to be removably coupled to the receptacle.

7. The system of claim 5, wherein a height of the handle is adjustable.

8. The system of claim 2, further comprising a pallet jack configured to removably couple to and transport the receptacle.

9. The system of claim 2, wherein the motor is an electric motor.

10. The system of claim 9, further comprising a battery configured to provide power to the electric motor.

11. The system of claim 2, wherein the motor is an internal combustion engine.

12. The system of claim 2, wherein the spinning blade comprises a material selected from the group consisting of steel, aluminum, and plastic.

13. The system of claim 2, wherein the scoop comprises a plurality of fingers positioned in spaced relation.

14. The system of claim 13, wherein the plurality of fingers are spaced approximately 0.5-3 inches apart.

15. The system of claim 4, further comprising a controller configured to control one or more of the plurality of wheels.

16. The system of claim 2, further comprising at least one sensor configured to detect animal waste.

17. The system of claim 16, wherein at least one sensor is a heat sensor, a visual sensor, or an odor sensor.

18. The system of claim 16, further comprising:

at least one processor;

a memory configured to store instructions, the instructions when executed by the processor are operable to:

receive, from the at least one senor, an indication that the animal waste has been detected; and after receiving the indication from the at least one sensor, send an instruction to the at least one motor to provide power to one or more of the impeller or one or more of the plurality of wheels.

19. The system of claim 16, further comprising:

a sensor configured to identify and communicate geographical location information;

at least one processor;

a memory configured to store instructions, the instructions when executed by the processor are operable to:

determine, using the geographical location information from the sensor, an approximate position of the system relative to one or more boundaries defined by a user;

determining that the approximate position of the system is nearing at least one of the one or more boundaries by comparing a distance between the approximate position and the at least one of the one or more boundaries to a threshold; and in response to determining that the approximate position of the system is nearing the at least one of the one or more boundaries, send a notification to a user device identifying the approximate position.

* * * * *